US006776626B2

(12) United States Patent
Huang et al.

(10) Patent No.: US 6,776,626 B2
(45) Date of Patent: Aug. 17, 2004

(54) ELECTRICAL CONNECTOR SYSTEM FOR MOBILE PHONES

(75) Inventors: San-Shan Huang, Kaohsiung (TW); Chien-Feng Chen, Taoyuan (TW)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/379,328

(22) Filed: Mar. 4, 2003

(65) Prior Publication Data

US 2003/0181078 A1 Sep. 25, 2003

(30) Foreign Application Priority Data

Mar. 6, 2002 (TW) ..................................... 91202609 U

(51) Int. Cl.[7] .............................................. H01R 12/00
(52) U.S. Cl. ..................... 439/76.1; 439/500; 439/298; 439/660; 439/638
(58) Field of Search ............................. 439/76.1, 500, 439/298, 660, 638

(56) References Cited

U.S. PATENT DOCUMENTS

| | | | | |
|---|---|---|---|---|
| 5,541,398 A | * | 7/1996 | Hanson ................. 235/462.46 |
| 5,747,786 A | * | 5/1998 | Cargin et al. .......... 235/462.46 |
| 6,171,138 B1 | * | 1/2001 | Lefebvre et al. ............ 439/500 |
| 6,350,133 B2 | * | 2/2002 | Christensen et al. .......... 439/66 |
| 6,461,193 B1 | * | 10/2002 | Matthies ..................... 439/509 |
| 6,468,101 B2 | * | 10/2002 | Suzuki ....................... 439/326 |
| 6,497,368 B1 | * | 12/2002 | Friend et al. .......... 235/472.01 |
| 6,511,329 B2 | * | 1/2003 | Yi-Tsung ................... 439/76.1 |

* cited by examiner

Primary Examiner—Truc Nguyen
(74) Attorney, Agent, or Firm—Stephen Z. Weiss

(57) ABSTRACT

An electrical connector system is provided for a mobile phone which includes a lower housing disposed beneath a printed circuit board having a plurality of circuit traces on a bottom side thereof. The housing includes at least one cavity in an upper side thereof opposite the bottom side of the printed circuit board. A connector module is positionable in the cavity and includes a frame having at least one connector thereon. The connector has at least one flexible contact for surface-engaging a respective circuit trace on the bottom side of the printed circuit board. A complementary interengaging mounting structure is provided between the frame of the connector module and the lower phone housing to releasably mount the module in the cavity. Thereby the module easily can be selectively removed from the housing for repair or replacement purposes.

22 Claims, 2 Drawing Sheets

ELECTRICAL CONNECTOR SYSTEM FOR MOBILE PHONES

FIELD OF THE INVENTION

This invention generally relates to the art of electrical connectors and, particularly, to an electrical connector system for a mobile phone.

BACKGROUND OF THE INVENTION

Mobile telephones have become extremely popular and are used by widespread populations throughout the world for communication purposes. FIG. 1 shows a typical mobile phone, generally designated 5, which includes a lower housing 6, an upper housing 7 and a printed circuit board 8 sandwiched therebetween. Typically, the printed circuit board is nested within lower housing 6. A plurality of electrical connectors are mounted on the printed circuit board, such as a SIM (Subscriber Identity Module) card connector 9, an I/O (input/output) connector 10, a battery connector 11, as well as other connectors associated with various functions of the mobile phone. The terminals or contacts of the connectors are permanently connected, as by soldering, to appropriate circuit traces on the printed circuit board. Most often, the circuit board is sufficiently large to accommodate adding other connectors to perform other functions, as required.

With the ever-increasing use of mobile phones as described above in relation to FIG. 1, more and more functions are being added to the phones. In addition, mobile phones are becoming lighter, thinner, shorter and smaller in overall dimensions. Still further, all kinds of different shapes and colors of mobile phone housings are being manufactured not only for aesthetic purposes, buy for uniqueness and novelty purposes as well.

With the wide variety of mobile phones of the character described above, problems are encountered when the connectors of the phones become damaged. For instance, if a user inadvertently damages a connector, such as breaking the terminals of the SIM connector or the terminals of the battery connector when inserting or removing a SIM card or replacing a battery, the mobile phone must be taken to a repair shop or sent back to the manufacturer for unsoldering and replacing elements as required. Consequently, the user cannot use the mobile phone during the entire repair down time. Aside from the various connectors, the printed circuit board, itself, may be damaged and have to be replaced.

The present invention is directed to solving these problems by providing a mobile phone with a connector module system wherein various connector modules can be replaced without having to repair the entire printed circuit board/connector assembly.

SUMMARY OF THE INVENTION

An object, therefore, of the invention is to provide a new and improved electrical connector system for mobile phones.

In the exemplary embodiment of the invention, a lower phone housing is disposed beneath a printed circuit board having a plurality of circuit traces on a bottom side thereof. The housing includes a plurality of module-receiving cavities in an upper side thereof opposite the bottom side of the printed circuit board. A plurality of connector modules are positionable in the cavities. Each connector module includes a frame having at least one connector thereon. The connector has at least one flexible contact for surface-engaging the respective circuit trace on the bottom side of the printed circuit board. Complementary interengaging mounting means are provided between the frames of the connector modules and the lower phone housing to releasably mount the modules in the cavities, whereby the modules easily can be selectively removed from the housing for repair or replacement purposes.

As disclosed herein, the module-receiving cavities are of different configurations for receiving differently configured connector modules. One connector module may include a SIM card connector and an associated I/O connector. The module also may include a battery connector and a microphone connector. Another connector module may include a loud speaker connector as well as a receptacle for receiving a loud speaker, as well as an earphone connector and/or a vibrator connector. A further connector module may include an antenna connector along with a receptacle for receiving an antenna.

The complementary interengaging mounting means may take various configurations, such as a flexible latch hook on the lower housing releasably engageable with the frame of at least one of the connector modules. The mounting means may comprise a plurality of engaging grooves in at least one of the module-receiving cavities for releasably receiving flange means on at least one of the connector modules. The mounting means may comprise a contoured frame in at least one of the module-receiving cavities for releasably receiving, in a press-fit arrangement, at least one of the connector modules.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
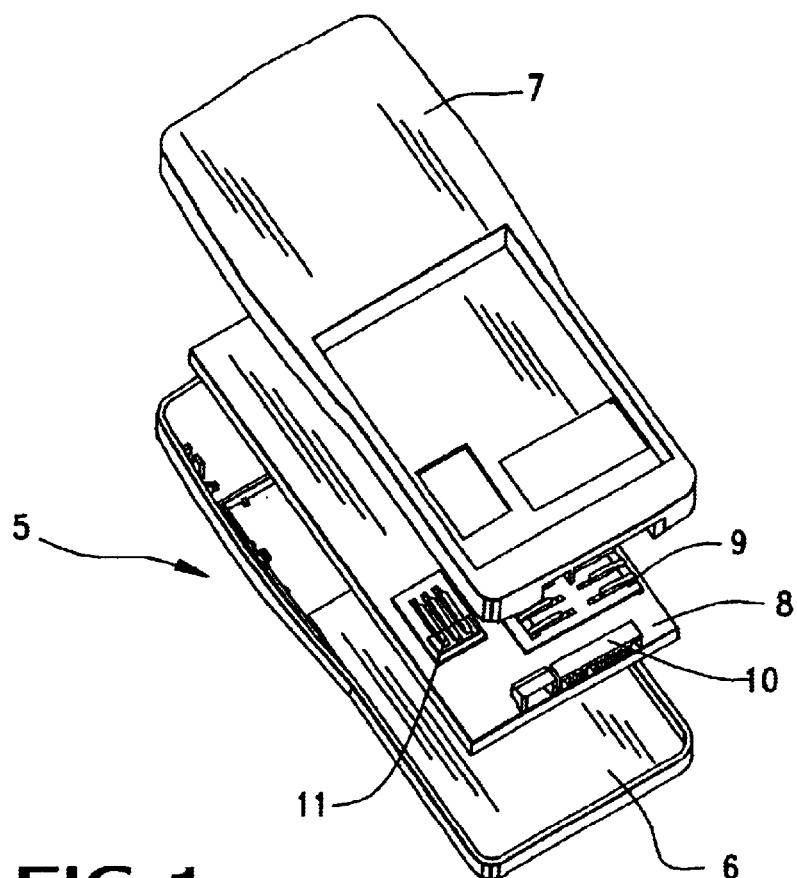
FIG. 1 is an exploded perspective view of a mobile phone according to the prior art.

Before proceeding with a detailed description of the invention, it should be understood that such terms as "top", "bottom", "upper", "lower" and the like herein and in the claims hereof are not in any way intended to be limiting in nature. These terms are used in reference to the orientation of the mobile phone shown in the drawings in order to provide a clear and concise understanding of the disclosed and claimed invention herein. Obviously, mobile phones are omni-directional in use and function.

Figure 3:
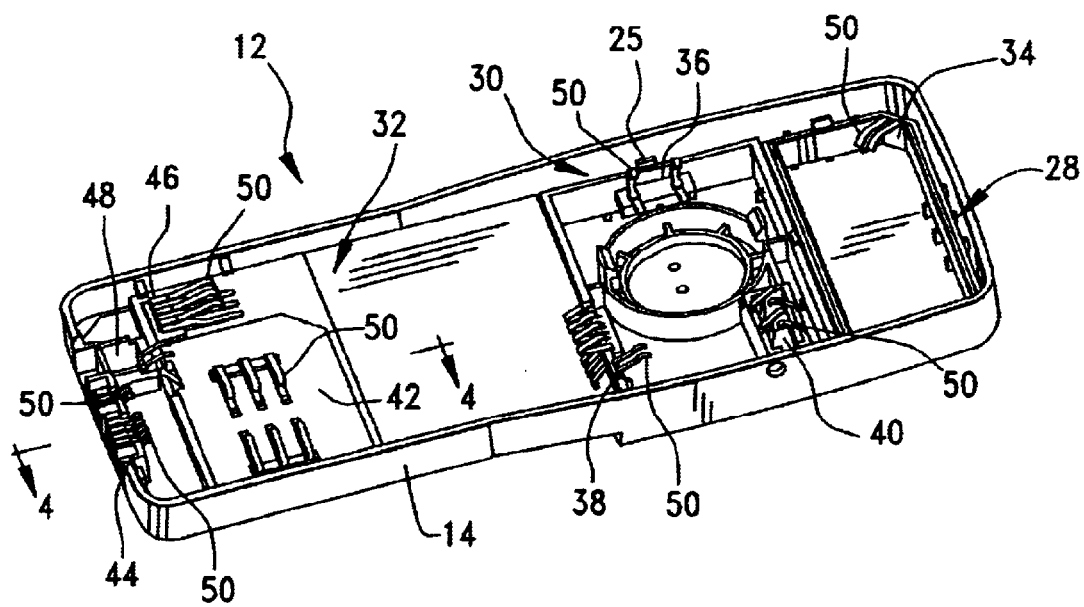
FIG. 3 is a perspective view of the components of FIG. 2, in assembled condition.
Figure 2:
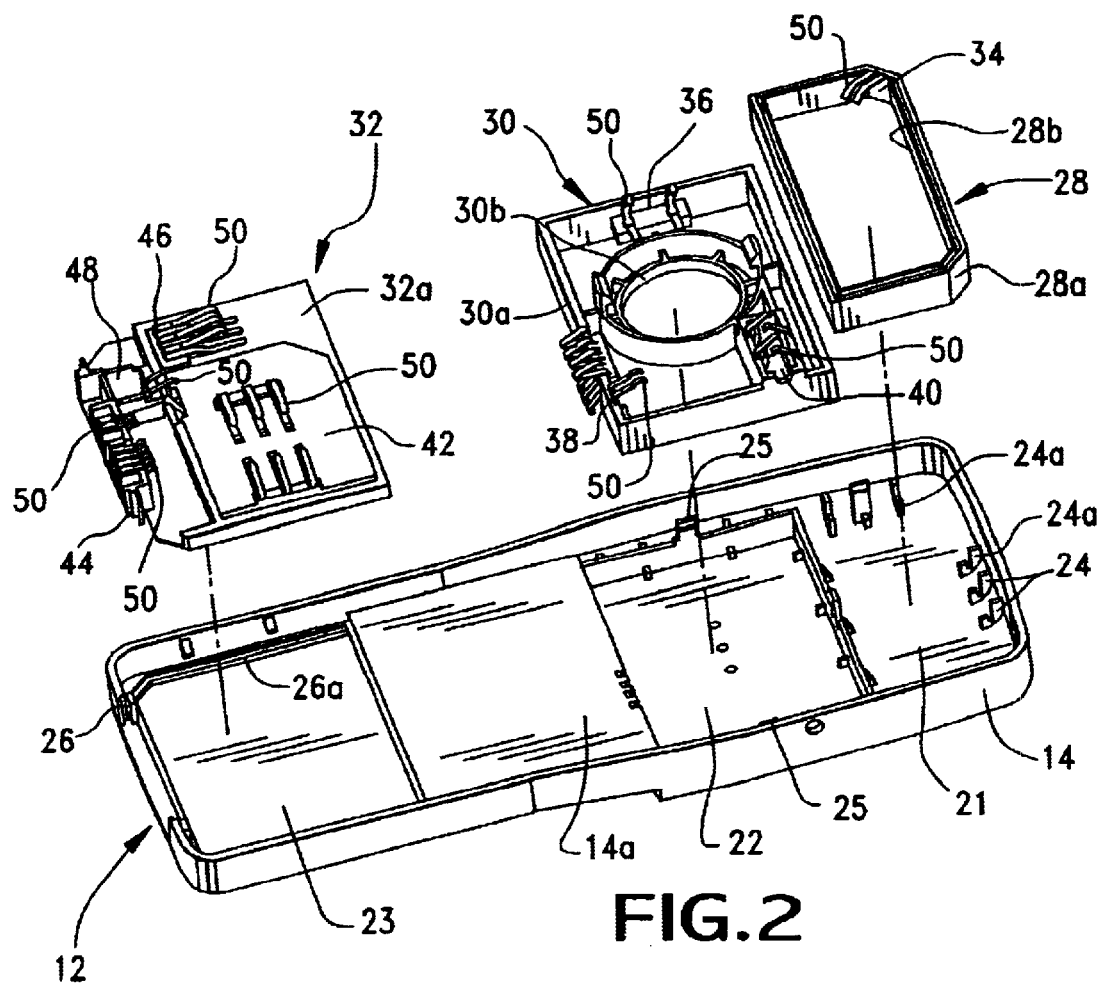
FIG. 2 is an exploded perspective view of the lower housing and connector modules of a mobile phone according to the invention.

With that understanding, and referring first to FIGS. 2 and 3, the invention is embodied in a mobile phone, generally designated 12, which includes a lower phone housing 14 which, as described in relation to FIG. 1, mates with an upper phone housing (not shown in the drawings). The lower housing is disposed beneath a printed circuit board 16 (FIG. 4) having a plurality of circuit traces 18 on a bottom side 16a of the printed circuit board. The circuit board is disposed between the upper and lower phone housings.

As best seen in FIG. 2, lower housing 14 includes a plurality of module-receiving cavities 21, 22 and 23 in an upper side 14a of the housing opposite the bottom side 16a of printed circuit board 16. Cavity 21 includes a plurality of engaging members 24 about the periphery thereof, the engaging members including upwardly directed engaging grooves 24a. Cavity 22 includes a pair of flexible latch hooks 25 at opposite sides thereof. Cavity 23 includes a peripheral contoured frame 26. Lower housing 14, including module-receiving cavities 21, 22 and 23, along with engaging members 24, latch hooks 25 and contoured frame 26, may be fabricated as a one-piece structure, such as unitarily molding the structure of plastic material.

A plurality of connector modules, generally designated 28, 30 and 32 are positionable in module-receiving cavities 21, 22 and 23, respectively. Each connector module 28, 30 and 32 includes a frame 28a, 30a and 32a, respectively.

Frame 28a of connector module 28 mounts an antenna connector 34. Frame 30a of connector module 30 mounts a loud speaker connector 36, a vibrator connector 38 and an earphone connector 40. Frame 32a of connector module 32 mounts a SIM card connector 42, an I/O connector 44, a battery connector 46 and a microphone connector 48. All of the connectors, including antenna connector 34, loud speaker connector 36, vibrator connector 38, earphone connector 40, SIM card connector 42, I/O connector 44, battery connector 46 and microphone connector 48 include flexible contact arms 50 for surface-engaging respective ones of the circuit traces 18 on bottom side 16a of printed circuit board 16. In addition, frame 28a of connector module 28 includes a receptacle 28b for receiving an antenna, and frame 30a of connector module 30 includes a receptacle 30b for receiving a loud speaker.

Generally, complementary interengaging mounting means are provided between the frames of connector modules 28, 30 and 32 and lower phone housing 14 to releasably mount the modules in cavities 21, 22 and 23. Thereby, the modules easily can be selectively removed from the lower housing for repair or replacement purposes.

More particularly, engaging grooves 24a of engaging members 34 about cavity 21 receive peripheral flanges of frame 28a of connector module 28. The flanges are press-fit into the grooves to securely hold the connector module in the cavity, but allow for removal of the connector module for repair or replacement purposes.

Flexible latch hooks 25 at opposite sides of cavity 22 snap into latching engagement above the top edges of frame 30a of connector module 30. This can be seen in FIG. 3. When it is necessary or desirable to remove connector module 30, the flexible latch hooks can be pushed outwardly to allow easy removal of the module, but the latch hooks securely hold the module in the cavity. Such flexible latch hooks easily can be used for any of the other connector modules.

Contoured frame 26 about the periphery of cavity 23 is sized and configured to receive connector module 32 by a press-fit arrangement. The contoured frame may include a groove 26a to further facilitate holding the module in the cavity. Regardless, the mounting means is effective to hold the connector module in the cavity, while allowing the module to be released and removed for repair or replacement purposes.

FIG. 3 shows all three connector modules 28, 30 and 32 mounted within their respective cavities in lower phone housing 14. If any of the connectors mounted on the connector modules are damaged for any reason, the complementary interengaging mounting means for that respective connector module is disengaged and the module simply is lifted out of the lower housing for repair or replacement purposes. The remainder of the connector modules are not affected at all.

Figure 4:
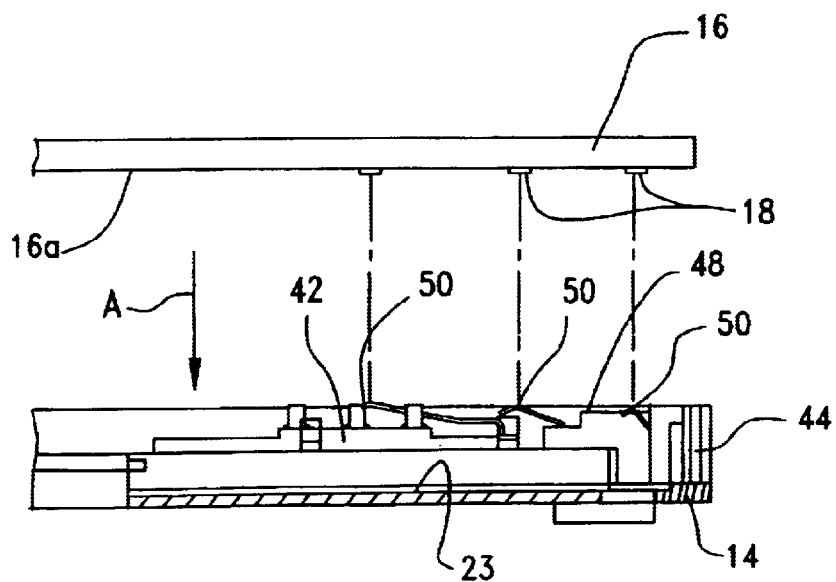
FIG. 4 is a fragmented vertical section taken generally along line 4—4 of FIG. 3.

In addition, FIG. 4 shows how printed circuit board 16 simply is lowered in the direction of arrow "A" onto the top of lower phone housing 14 until circuit traces 18 on bottom side 16a of the circuit board engage flexible contact arms 50 of the various connector modules. There are no permanent solder connections as is prevalent with the prior art. If any of the connectors of any of the connector modules are damaged, printed circuit board 16 simply is lifted off of the lower connector housing to gain access to the connector modules which are releasably mounted in their respective cavities in the lower housing and easily can be removed.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An electrical connector system for a mobile phone, comprising:

a lower phone housing disposed beneath a printed circuit board having a plurality of circuit traces on a bottom side thereof, the housing including a plurality of module-receiving cavities in an upper side thereof opposite the bottom side of the printed circuit board;

a plurality of connector modules positionable in said cavities, each connector module including a frame having at least one connector thereon, and the connector having at least one flexible contact for surface-engaging a respective circuit trace on the bottom side of the printed circuit board; and complementary interengaging mounting means between the frames of the connector modules and the lower phone housing to releasably mount the modules in the cavities whereby the modules easily can be selectively removed from the housing for repair or replacement purposes.

2. The electrical connector system of claim 1 wherein said module-receiving cavities are of different configurations for receiving differently configured connector modules.

3. The electrical connector system of claim 1 wherein said complementary interengaging mounting means comprise a flexible latch hook on the lower phone housing releasably engageable with the frame of at least one of the connector modules.

4. The electrical connector system of claim 1 wherein said complementary interengaging mounting means comprise a plurality of engaging grooves in at least one of the module-receiving cavities for releasably receiving flange means on at least one of the connector modules.

5. The electrical connector system of claim 1 wherein said complementary interengaging mounting means comprise a contoured frame in at least one of the module-receiving cavities for releasably receiving in a press-fit arrangement at least one of the connector modules.

6. The electrical connector system of claim 1 wherein one of said connector modules includes a SIM card connector and an I/O connector.

7. The electrical connector system of claim 6 wherein said one connector module also includes a battery connector and a microphone connector.

8. The electrical connector system of claim 1 wherein one of said connector modules includes a loud speaker connector.

9. The electrical connector system of claim 8 wherein said one connector module includes a receptacle for receiving a loud speaker.

10. The electrical connector system of claim 8 wherein said one connector module includes an earphone connector and a vibrator connector.

11. The electrical connector system of claim 1 wherein one of said connector modules includes an antenna connector.

12. The electrical connector system of claim 11 wherein said one connector module includes a receptacle for receiving an antenna.

13. An electrical connector system for a mobile phone, comprising:
- a printed circuit board having a plurality of circuit traces on a bottom side thereof;
- a lower phone housing beneath the printed circuit board and having at least one cavity in an upper side of the housing opposite the bottom side of the printed circuit board;
- a connector module positionable in said cavity and including a frame having at least one connector thereon, the connector having at least one flexible contact for surface-engaging a respective circuit trace on the bottom side of the printed circuit board; and
- complementary interengaging mounting means between the frame of the connector module and the lower phone housing to releasably mount the module in the cavity whereby the module easily can be selectively removed from the housing for repair or replacement purposes, said complementary interengaging mounting means comprising a plurality of engaging grooves in the module-receiving cavity for releasably receiving flange means on the connector module.

14. The electrical connector system of claim 13 wherein said complementary interengaging mounting means comprise a countoured frame in the module-receiving cavity for releasably receiving in a press-fit arrangement the connector module.

15. The electrical connector system of claim 13 wherein the connector module includes a SIM card connector and an I/O connector.

16. The electrical connector system of claim 15 wherein the connector module also includes a battery connector and a microphone connector.

17. The electrical connector system of claim 13 wherein the connector module includes a loud speaker connector.

18. The electrical connector system of claim 17 wherein the connector module includes a receptacle for receiving a loud speaker.

19. The electrical connector system of claim 17 wherein the connector module includes an earphone connector and a vibrator connector.

20. The electrical connector system of claim 13 wherein the connector module includes an antenna connector.

21. The electrical connector system of claim 20 wherein the connector module includes a receptacle for receiving an antenna.

22. An electrical connector system for a mobile phone, comprising:
- a printed circuit board having a plurality of circuit traces on a bottom side thereof;
- a lower phone housing beneath the printed circuit board and having at least one cavity in an upper side of the housing opposite the bottom side of the printed circuit board;
- a connector module positionable in said cavity and including a frame having at least one connector thereon, the connector having at least one flexible contact for surface-engaging a respective circuit trace on the bottom side of the printed circuit board; and
- complementary interengaging mounting means between the frame of the connector module and the lower phone housing to releasably mount the module in the cavity whereby the module easily can be selectively removed from the housing for repair or replacement purposes, said complementary interengaging mounting means comprising a flexible latch hook on the lower phone housing releasably engageable with the frame of the connector module.

* * * * *